United States Patent

Staley, Jr.

[15] 3,656,176
[45] Apr. 11, 1972

[54] RECORDING MODULE FOR A RECORDER

[72] Inventor: Walton F. Staley, Jr., Philadelphia, Pa.

[73] Assignee: Leeds & Northrup Company, North Wales, Pa.

[22] Filed: July 8, 1970

[21] Appl. No.: 53,141

[52] U.S. Cl. ........................................................... 346/145
[51] Int. Cl. .................................................... G01d 11/24
[58] Field of Search ........................................... 346/145, 49

[56] References Cited

UNITED STATES PATENTS

| | | | |
|---|---|---|---|
| 2,002,686 | 5/1935 | Belaef | 346/49 |
| 2,153,317 | 4/1939 | Sigo | 346/49 |
| 3,161,459 | 12/1964 | Conklin | 346/145 |
| 3,401,403 | 9/1968 | Staley | 346/145 |

*Primary Examiner*—Joseph W. Hartary
*Attorney*—Woodcock, Washburn, Kurtz and Mackiewicz

[57] ABSTRACT

A round or strip chart recorder preferably of the self-balancing type for recording and indicating the values of a plurality of measured quantities. This recorder is characterized by a plurality of stacked recording modules each comprised of a pivoted frame including a pair of side plates or arms secured in parallel spaced relation by support shafts which also serve as guide rods for a marker carriage assembly. The frame supports a scale, motor and drive means for the marker carriage, and a marker carriage assembly supporting a marker and index. In a preferred embodiment the recorder is an automatic self-balancing strip chart recorder employing a plurality of pivoted recording modules having capillary pens. Each recording module will additionally include one or more slidewire assemblies and a tray for support of a flexible capillary tube. The use of hinged recording modules provides access for servicing without unplugging or disassembly of any recording module. Each recording module may be disconnected for elimination or replacement of the module without unplugging or disassembly. Additionally, depending upon the number of pairs of pivot points provided in the recorder main frame structure, a recorder is readily assembled or later modified in a manner to include a larger or smaller number of recording modules.

7 Claims, 4 Drawing Figures

RECORDING MODULE FOR A RECORDER

BACKGROUND OF THE INVENTION

1. Field of the Invention

This invention relates generally to the field of recorders of the type found in U.S. Pat. Off. Class 346-Recorders and more specifically it relates to recorders having a plurality of pen systems for simultaneously recording on a single chart different measured quantities.

2. Description of the Prior Art

In my U.S. Pat. No. 3,401,403 there is disclosed and claimed a strip chart recorder employing stackable pen and slidewire modules. As pointed out in that patent measuring circuits and motor driving means applicable for use in recorders of that patent and equally useful in recorders of the type herein described may be as shown in U.S. Pat. No. 2,113,164 and U.S. Pat. No. 2,367,746 each issued to A. J. Williams, Jr. and assigned to applicant's assignee. Electrical measuring circuits and mechanical features of the types disclosed in the two Williams patents are by now well known and quite conventional and therefore no detailed description of such recorders is deemed necessary. As known to those skilled in the art, self-balancing recorders employ a transducer to convert a measured quantity into an electrical signal which is fed into a measuring network. Variations in the measured quantity cause an unbalance of the measuring network which produces an output signal utilized to drive a servo motor. The shaft of the servo motor is, for example, connected relatively to move a contact with respect to a slidewire which is electrically connected in the measuring network so that variations in the included portion of the slidewire resistance tend to rebalance the measuring network and reduce the output signal to zero. In this manner the position of the contact along the measuring slidewire when the measuring circuit is balanced is proportional to the magnitude of the measured quantity. By providing an indicating device and/or a recording pen which moves in correspondence with the relative movement between the slidewire and contact, the value of the measured quantity may be indicated and/or recorded.

In my prior U.S. Pat. No. 3,401,403 the stackable pen and slidewire modules provided a desirable advantage from a manufacturing point of view in that duplicate parts could be used and a recording instrument made initially or readily changed over in the field simply by adding or subtracting parts as necessary to make, for example, a single pen, a two-pen or a three-pen recorder. However, while the stackable pen and slidewire module form of construction made possible replacement of a module and/or the addition or subtraction of pen modules, this form of construction left something to be desired in that parts lower in the stack were not readily accessible for servicing. My prior stackable construction required removal of an upper module in order to gain access to a lower module and likewise required unstringing the drive cable for the pen assembly.

While as disclosed in U.S. Pat. Nos. 2,074,117; 2,113,748; 2,647,813; and 3,438,049 it has been known to employ modular forms of construction and provide hinged pen assemblies of one form or another such features have not been employed in a manner suitable for use in a multi-pen recorder of the type where each pen traverses substantially the full width of the recorder chart. It is therefore a primary object of the present invention to provide a recording instrument with hinged pen modules in stacked array one above the other not only adapted to be readily assembled to record and indicate different numbers of measured quantities but additionally one which may be more readily serviced by merely raising one or more pivoted pen modules without partial disassembly.

SUMMARY OF THE INVENTION

In accordance with applicant's invention there is provided a recorder of the type including a plurality of chart marking means for recording the values of a plurality of measured quantities. The recorder comprises in combination a recorder main frame, means on the main frame for pivotally mounting a plurality of recording modules to form a stacked array and means on the main frame for supporting a chart on which a record of the values of measured quantities are to be recorded. The recorder additionally comprises recording modules each including a pair of spaced apart side arms forming part of a recording module frame supporting a scale, guide structure for a marker carriage, a motor to move a marker carriage, a marker carriage connected to the motor supported for slideable engagement along the guide structure, and means associated with the side arms for cooperation with the means on the recorder main frame for pivotally mounting the recording module thereon.

The recording module frame is additionally provided with means for adjusting the distance between the recording module frame and the chart when swung about its pivots to a recording position.

More specifically in accordance with applicant's invention there is provided a strip chart recorder of the self-balancing type including plural chart marking means for recording the values of measured quantities. The recorder comprises in combination a recorder main frame, means on the main frame for pivotally mounting a plurality of recording modules to form a stacked array and means on the main frame for supporting a chart on which a record of the values of one or more measured quantities are to be recorded. The recorder additionally comprises a plurality of recording modules each including a pair of spaced apart side arms forming part of a recording module frame which supports a scale, guide structure for a pen carriage, a servo motor of a self-balancing measuring system for moving a pen carriage back and forth across the chart in accordance with the value of a measured quantity, a slidewire for the self-balancing measuring system, a pen carriage having a pen and an index to cooperate with the scale, said pen carriage being mounted for movement along the guide structure, and means connected to the pen carriage and driven by the servo motor to position the pen carriage relative to the chart and scale in accordance with the value of a measured quantity. Also included in the recording modules are means associated with the side arms of the module for cooperation with the means on the recorder main frame for pivotally mounting the module thereon and means for adjusting the distance between each module and the chart when each module is swung about its pivots to a recording position.

In the preferred form of the invention the chart marking means is a capillary pen and the module includes a tray supporting a sufficient length of capillary tube to provide for full traverse of the pen. The slidewire is a straight slidewire and trolley assembly and the pen carriage includes electrical contacts for sliding engagement with the slidewire and trolley.

DESCRIPTION OF THE DRAWINGS

The subject matter regarded as the invention is particularly pointed out and distinctly claimed in the appended claims. The invention, however, both as to its mode of operation together with further objects and advantages thereof, may best be understood with reference to the following description and the accompanying drawings in which:

DESCRIPTION OF PREFERRED EMBODIMENTS

Figure 1:
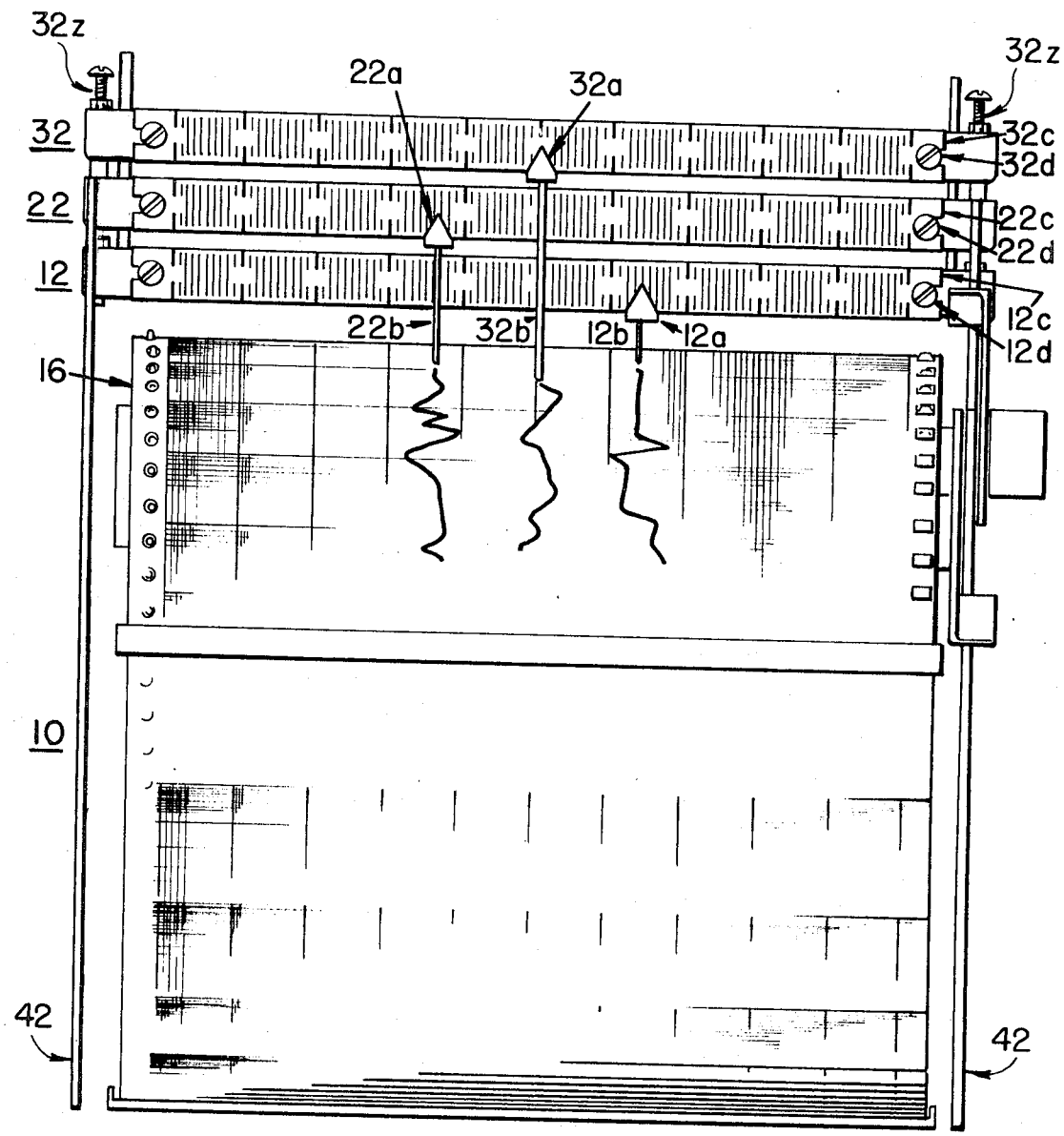
FIG. 1 is a front elevation of a recorder in accordance with my invention.

In the various figures of the drawings the same reference numerals are used to identify like parts.

Referring to FIG. 1 of the drawings, a three-pen recorder 10 adapted to indicate and record simultaneously the magnitudes of three measured quantities is employed to illustrate features of applicant's invention. One of the measured quantities is indicated and recorded using a recording module 12 which includes an indicating pointer 12a and a pen 12b of the capillary type. The pointer 12a indicates the magnitude of a first measured quantity on a scale 12c which is fastened to the module 12 by screws 12d. The pen 12b records the values of the measured quantity on a strip chart 16. The chart 16 is advanced in a known manner by means of sprocket wheels driven by a motor. Since the chart drive forms no part of applicant's invention the details are omitted. A second recording module 22 is substantially like the first recording module 12. It includes an index 22a, a capillary pen 22b, and a scale 22c supported by mounting screws 22d. The recording module 22 indicates and records the magnitude of a second measured quantity. Its pointer 22a and pen 22b are dimensioned so that they will pass slightly in front of the pen and pointer of module 12. A third recording module 32 likewise includes an index 32a, a capillary pen 32b and a scale 32c secured to the module by means of screws 32d for indicating and recording the values of a third measured quantity. Its pointer and pen are dimensioned so that they will pass in front of the pointer and pen of module 22. As can be seen in FIG. 1, the recording modules 12, 22 and 32 appear as a stacked array.

Figure 2:
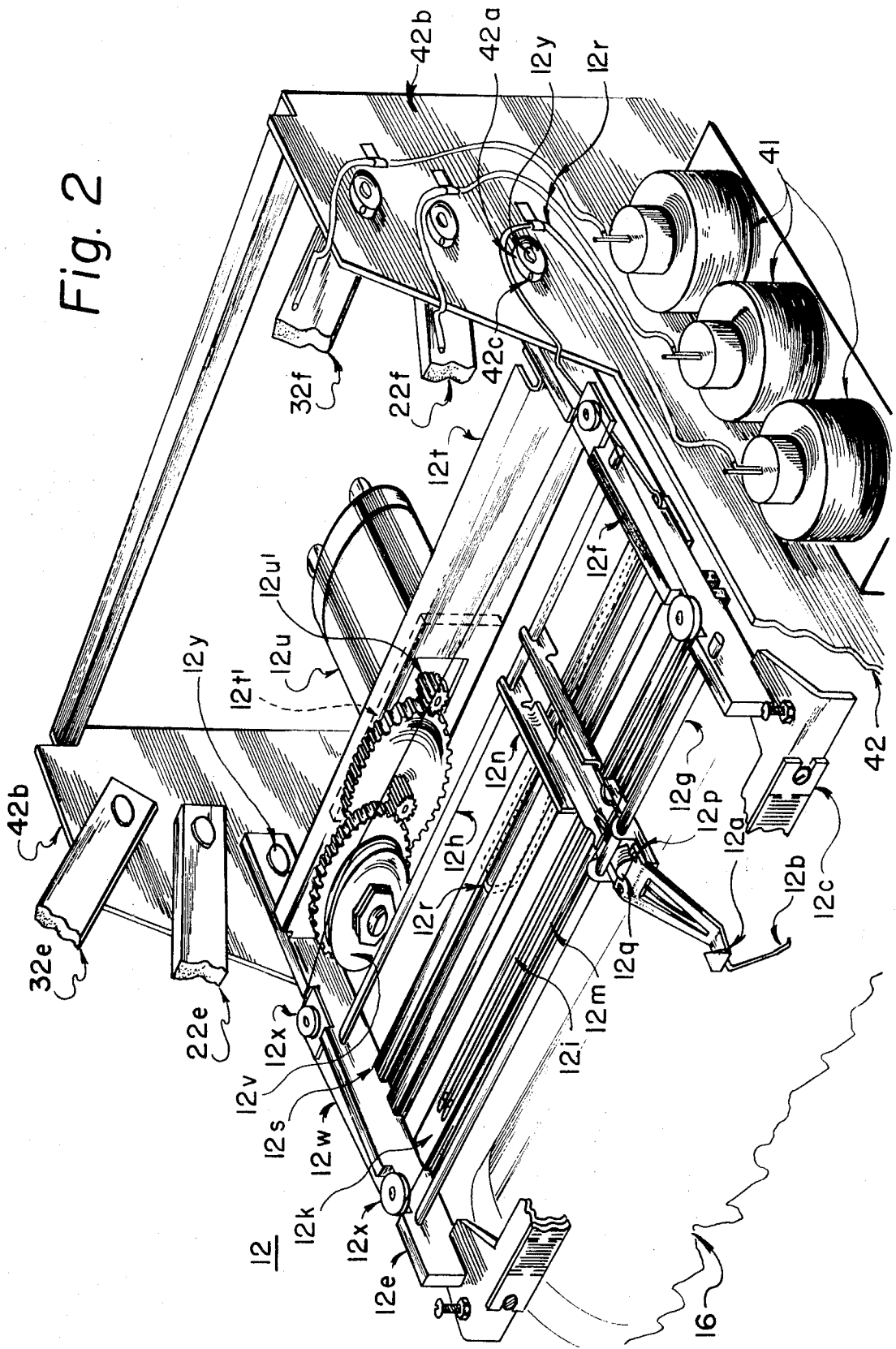
FIG. 2 is a perspective view of a recording module pivotally mounted in accordance with my invention.

Referring now to FIG. 2 there is shown more in detail the recording module 12. It includes a pair of similarly shaped side arms 12e and 12f secured in spaced parallel relation by means of guide rods 12g and 12h to form a recording module frame. Affixed to the frame parallel to the guide rods is a bar 12k which supports a slidewire and a trolley numbered 12i and 12m respectively. Slideably mounted along the guide rods 12g and 12h is a pen carriage 12n. This pen carriage supports the index 12a which is attached thereto by means of mounting screws 12p. The capillary pen 12b is attached to a surged tank 12q which is connected by means of a flexible capillary tube 12r to an ink bottle 41 supported on a recorder frame 42 in any suitable manner. Supported between the side arms 12e and 12f is a box-like tray 12s having a bottom, sides, and short tabs turned inwardly to form a top with an elongated slot-like opening the length thereof. This tray 12s supports an excess length of the flexible capillary tube 12r which permits free lateral movement of the pen carriage from one edge of the chart to the other. The tray retains the capillary as part of the module 12 and prevents its dropping down between other parts of the recorder.

Toward the rear of the arms 12e and 12f there is secured a cross-member 12t which supports a spacer block 12t' of insulating material on which is mounted a servo motor 12u having a pinion gear 12u' which meshes with a spur gear assembly which rotates a cable drive drum 12v. This drum drives a cable 12w secured to the pen carriage 12n to move the pen carriage 12n back and forth across the recorder chart in accordance with the values of a measured quantity as taught in the aforementioned Williams, Jr. patents. Pulleys 12x are supported at suitable locations on the side arms 12e and 12f for guiding the cable 12w.

Figure 4:
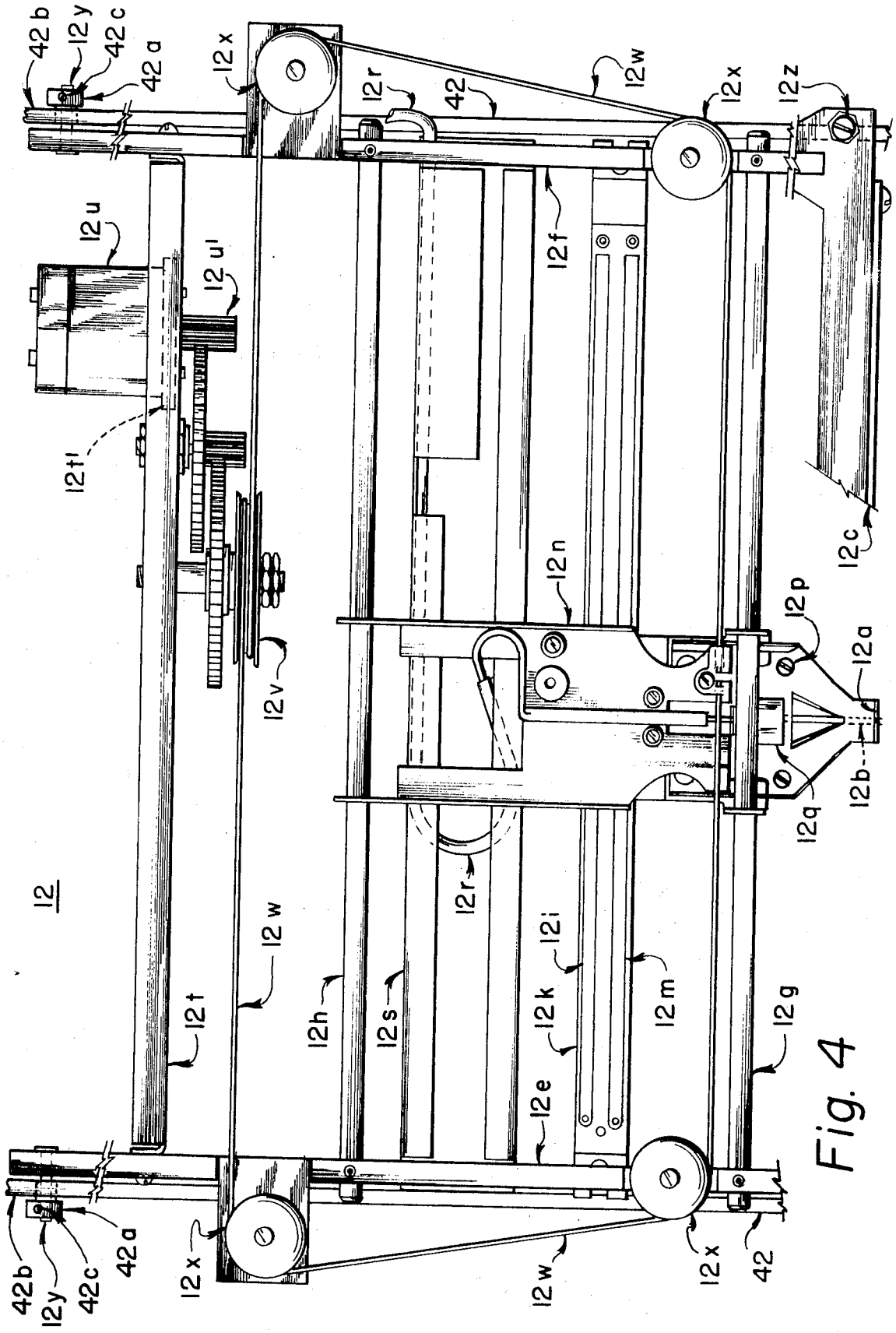
FIG. 4 is a top plan view of a recording module in accordance with this invention.

Near the right hand end of each of the side arms 12e and 12f, as viewed in FIG. 2, and best shown in FIG. 4, are aligned pivot pins 12y which are journaled in bushings 42a carried by upwardly extending portions 42b of the recorder frame 42. The pivot pins have a head on one end. The end in the bushing is secured by set screws 42c. By loosening the set screws and unplugging electrical connections (not shown) the pins 12y may be pulled and a recording module removed without disassembly thereof. In FIG. 2 the side arms 22e and 22f and 32e and 32f of second and third recording modules 22 and 32 are shown broken off. These ends of arms indicate the relative positions of mounting recording modules 22 and 32.

Figure 3:
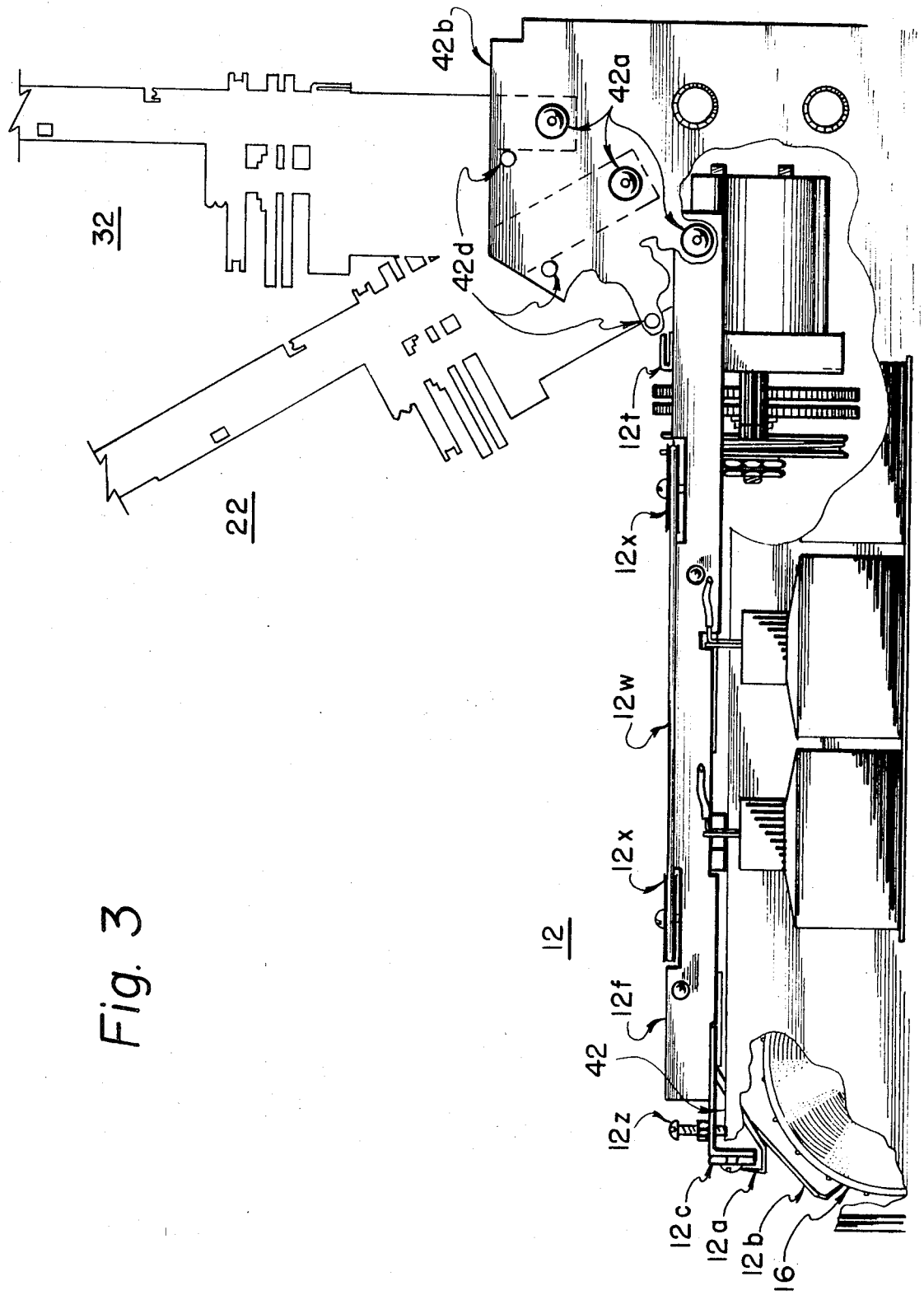
FIG. 3 is a partial side elevation showing three recording modules pivotally mounted in accordance with my invention.

Referring to FIG. 3 which is a side elevation of the recorder with the near side of the recorder frame 42 broken away, there is shown in considerably detail, the recording module 12 lowered into recording position with its capillary pen 12b in contact with the recorder chart 16. In FIG. 3 the modules 22 and 32 are shown in general outline, broken off, and with parts omitted. They are shown raised from their recording positions as may be desirable for servicing. The modules may be retained in their raised positions by any suitable pin or latch mechanism indicated by pins 42d. Each of the recording modules 12, 22, and 32 respectively includes a pair of leveling screws 12z, 22z and 32z respectively for precisely adjusting the contact between the pens 12b, 22b, and 32b and the chart 16 when each of the modules is lowered into its recording position. One such leveling screw 12z is shown in each of FIGS. 2-4 and the pair 32z is shown in FIG. 1.

FIG. 4 is a top plan view of the recording module 12. As before mentioned the recording modules 22 and 32 are substantially identical in construction to that of the recording module 12 except for placement of their servo motors and drive drums which are laterally displaced so that one is not above the other thus to conserve space in a manner permitting the recording modules to be closely spaced one above the other. FIG. 4 more clearly illustrates the manner in which the recording modules are supported in the portions 42b of recorder frame 42 and other details of construction shown in FIG. 2 may be better understood by inspection of the corresponding parts shown in FIG. 4. Further description with respect to FIG. 4 is believed unnecessary.

While the invention has been described in terms of a preferred embodiment, namely the utilization of one to three recording modules disposed one above the other and pivoted so that the modules can be raised to facilitate servicing of the recorder, easy replacement thereof, removal in order to provide a recorder with a fewer number of pens, or facilitate adding a recording module to provide a recorder having more pens, it should be understood that the invention is not limited to the utilization of three recording modules but rather is characterized in that any greater or lesser number of modules may be utilized as desired. Furthermore, the specific structure described with reference to the drawings should not be considered limiting, inasmuch as the principles underlying the invention will suggest to those skilled in the art many modifications of this structure which come within the scope of the claims.

What is claimed is:

1. A strip chart recorder including a plurality of chart marking means for recording the values of a plurality of measured quantities, comprising
   a recorder main frame,
   means on said main frame for pivotally mounting a plurality of recording modules to form a stacked array with one pen module above another,
   means on said main frame for supporting a chart on which a record of the values of said measured quantities are to be recorded,
   a plurality of recording modules each including a pair of spaced apart side arms forming part of a recording module frame supporting a scale, guide structure for a marker carriage, a motor to move a marker carriage, a marker carriage supporting an index for cooperation with said scale and a marker for making a record on said chart, said carriage being connected to the motor and supported by and for slideable engagement along said guide structure,
   each of said recording modules having its said motor laterally displaced with respect to that of the other modules permitting the modules to be closely spaced one above the other,
   means associated with said side arms for cooperation with said means on the recorder main frame for pivotally mounting the recording modules thereon, and
   each said recording module frame additionally having means for adjusting the distance between the recording module frame and said chart when moved to a recording position.

2. A strip chart recorder according to claim 1 wherein said motor is an electric servo motor of a self-balancing measuring system and each of said recording modules additionally includes a slidewire for said self-balancing measuring system.

3. A recorder according to claim 2 wherein said slidewire is supported parallel to said guide structure and said marker carriage supports an electrical contact for sliding engagement along said slidewire.

4. A recorder according to claim 1 wherein said marker is a capillary pen and a tray is supported by said recording module frame to support a length of flexible capillary tubing.

5. A strip chart recorder of the self-balancing type including a plurality of chart marking means for recording the values of one or more measured quantities, comprising a recorder main frame, means on said main frame for pivotally mounting a plurality of recording modules to form a stacked array, means on said main frame for supporting a chart on which a record of the values of said measured quantities are to be recorded., a plurality of recording modules each including a pair of spaced apart side arms forming part of a recording module frame which supports a scale, guide structure for a marker carriage, a servo motor of a self-balancing measuring system for moving a marker carriage back and forth across the chart in accordance with the value of a measured quantity, a slidewire for said self-balancing measuring system, a marker carriage having an index to cooperate with said scale and a marker for marking a record on said chart, said marker carriage being mounted for movement along said guide structure, and means connected to said marker carriage and driven by said servo motor to position said marker carriage relative to the chart and scale in accordance with the value of a measured quantity, each of said recording modules having its said motor laterally displaced with respect to that of the other modules permitting the modules to be closely spaced one above the other, means associated with the side arms of the module for cooperation with the means on the recorder main frame for pivotally mounting the modules thereon, and each said recording module frame additionally including means for adjusting the distance between said module and said chart when said module is moved to a recording position.

6. A strip chart recorder according to claim 5 wherein said marker is a capillary pen and said recording module frame includes a tray to support a length of flexible capillary tubing connected to said pen.

7. A strip chart recorder according to claim 6 wherein said slidewire is supported parallel to said guide structure and said marker carriage supports electrical contacts for sliding engagement along said slidewire.

* * * * *